Jan. 23, 1968 C. A. NAPOR ET AL 3,364,552
METHOD AND MEANS FOR ASSEMBLING AND LOADING FILM CARTRIDGES
Filed Nov. 18, 1965 5 Sheets-Sheet 1
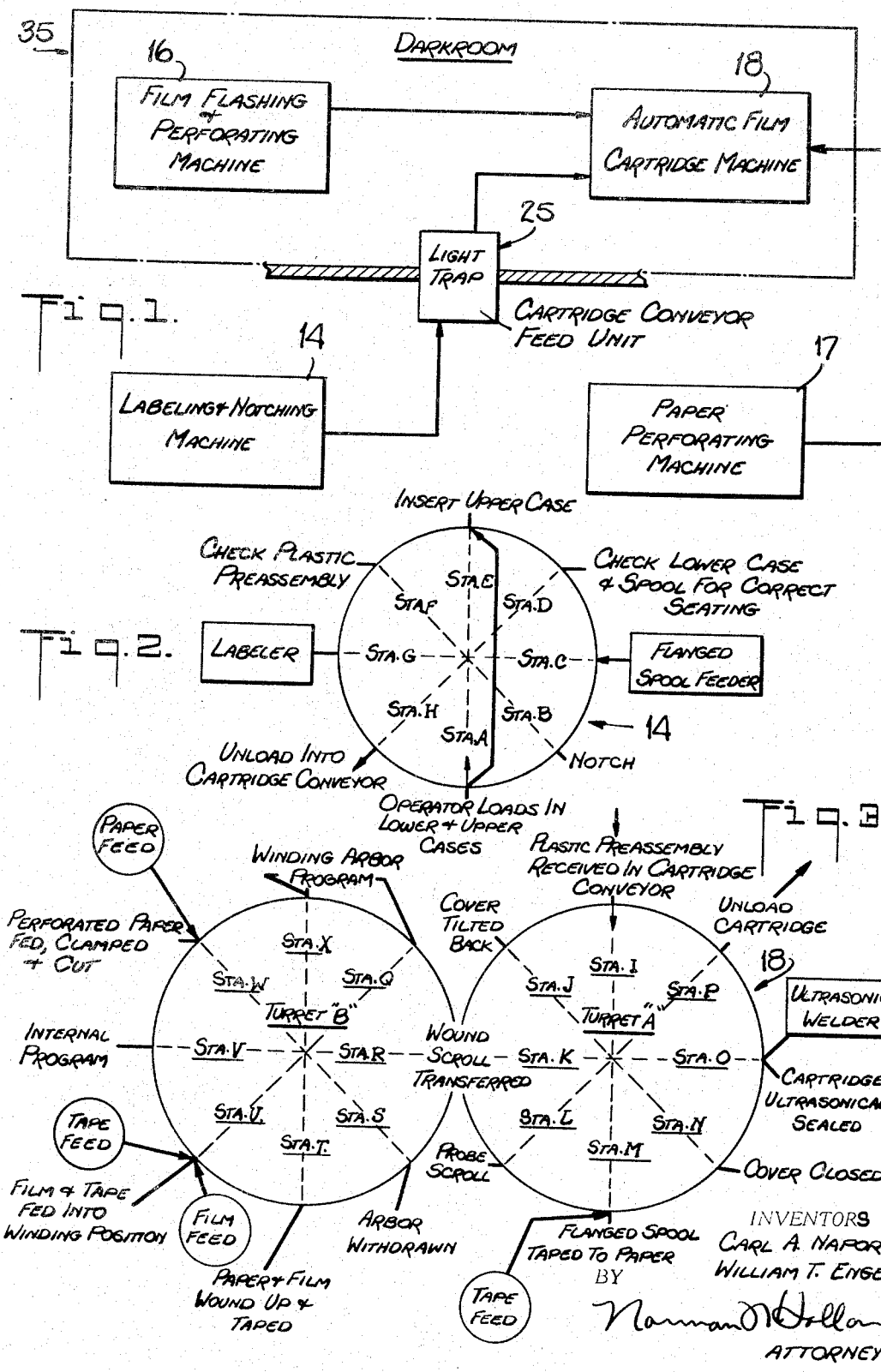

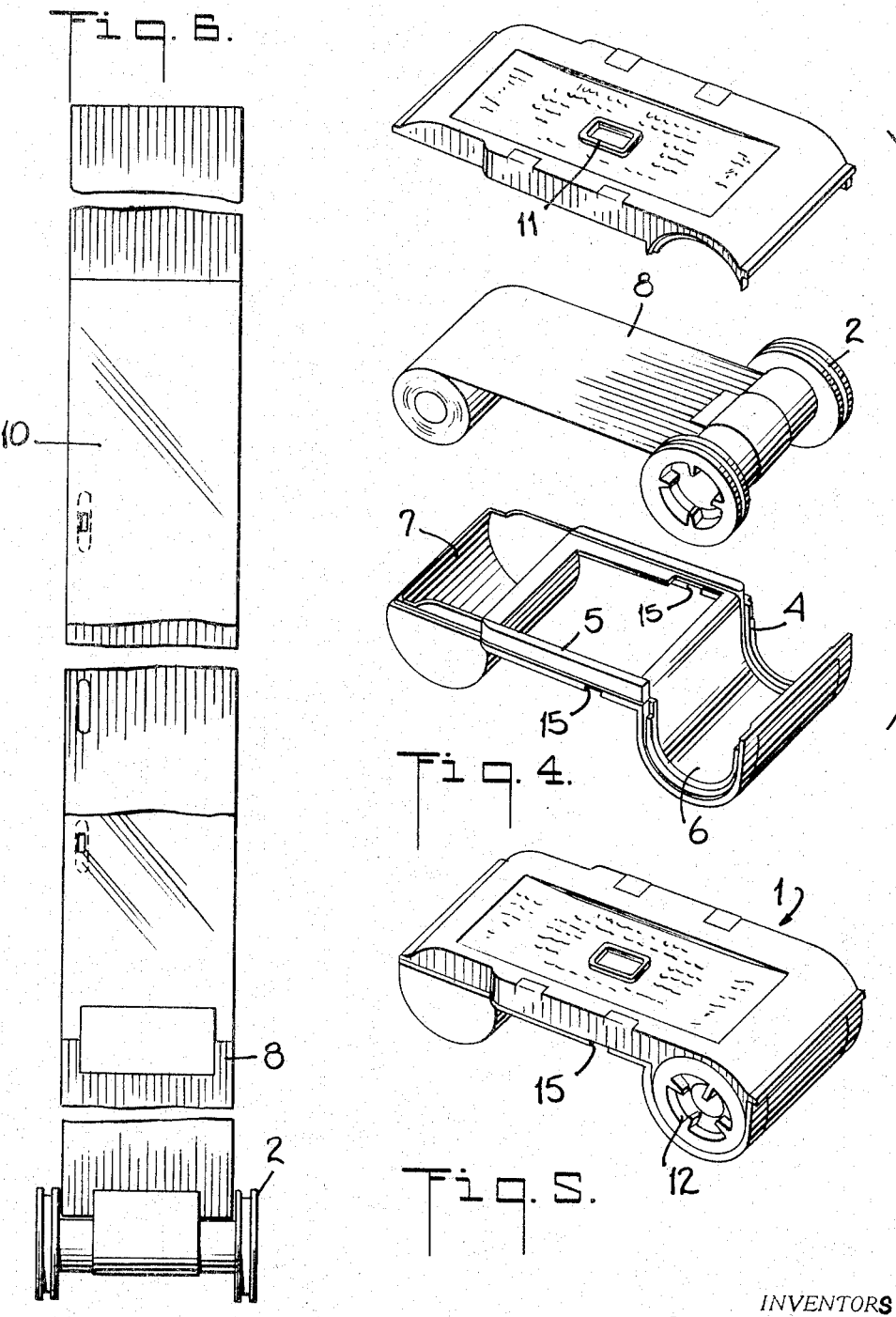

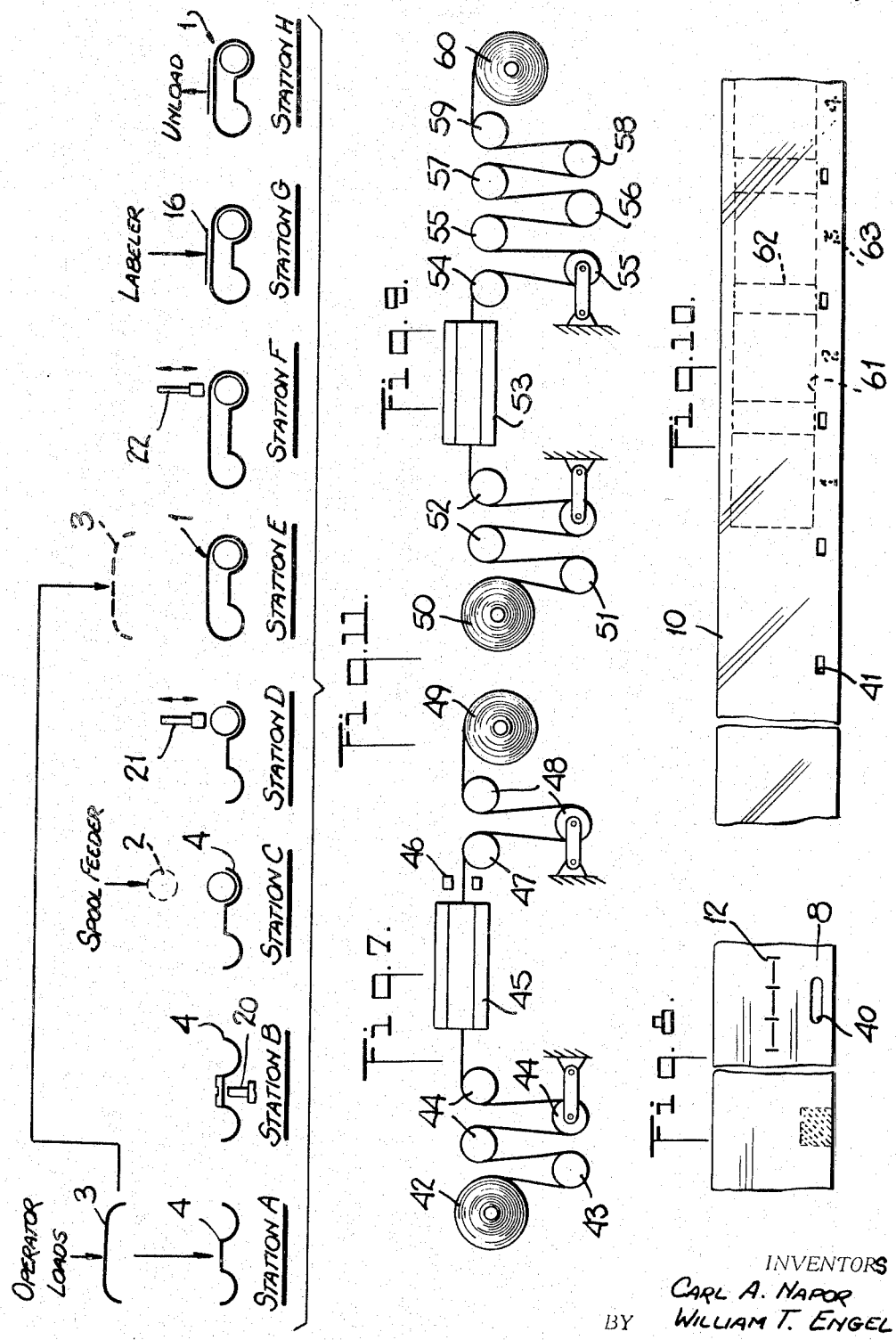

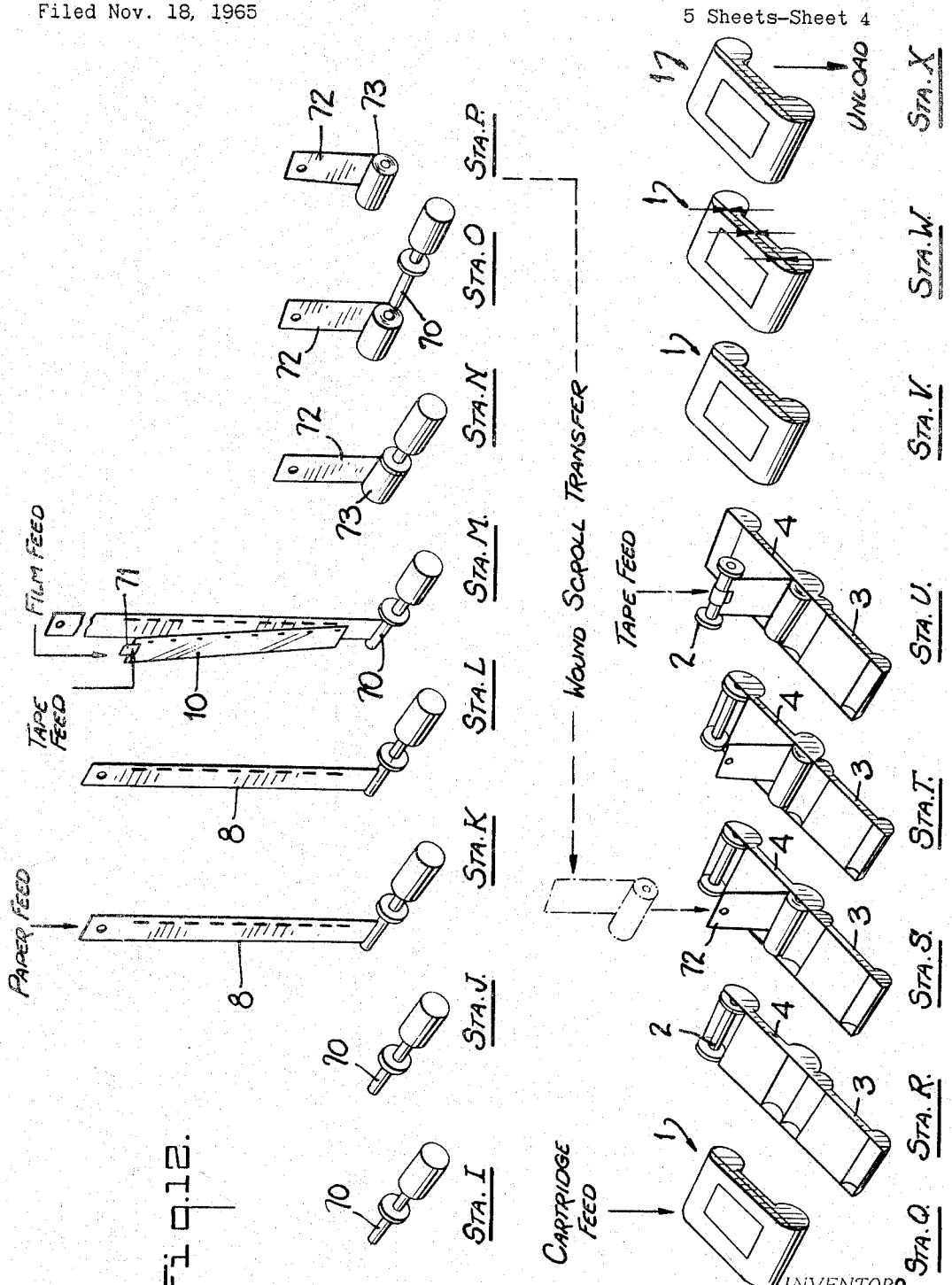

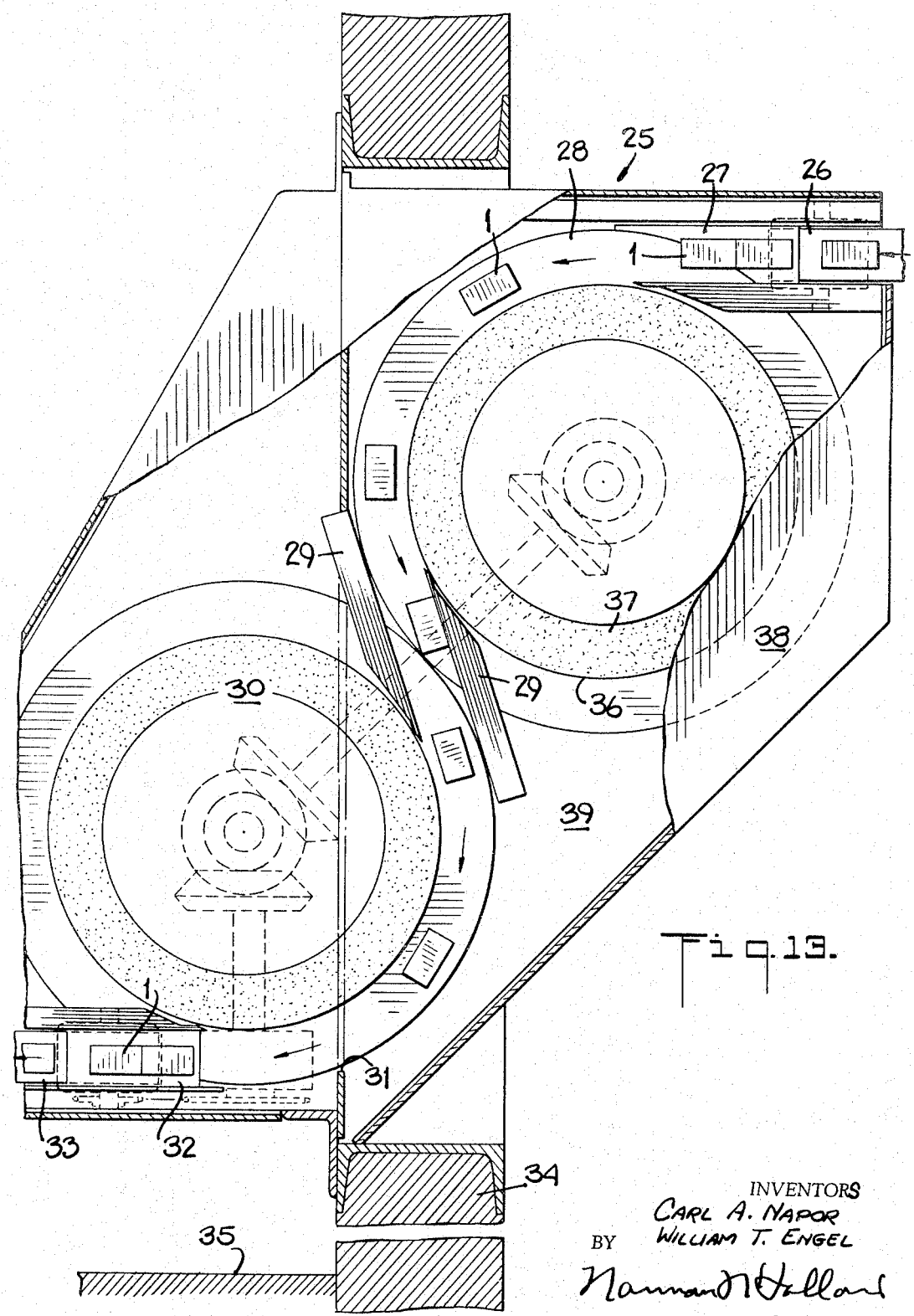

United States Patent Office 3,364,552
Patented Jan. 23, 1968

3,364,552
METHOD AND MEANS FOR ASSEMBLING AND
LOADING FILM CARTRIDGES
Carl A. Napor, Glen Ridge, and William T. Engel, Union, N.J., assignors to Kahle Engineering Company, Union City, N.J., a corporation of New Jersey
Filed Nov. 18, 1965, Ser. No. 508,474
8 Claims. (Cl. 29—208)

The present invention relates to the assembly of cartridges of the type used for photographic film and more particularly to a means for automatically assembling a hollow film cartridge including a spool and film strip such as is used in photographic still cameras.

Cartridges of the type assembled by this invention have been developed and placed on the market for use in conventional cameras which are used to take a series of pictures on a strip of film as, for example, a strip which may accommodate a dozen separate photographs.

One such cartridge is described, for example, in issued U.S. Patent No. 3,138,081. This cartridge includes a hollow plastic body having top and bottom portions and including a spool attached to one end of a rolled strip of film and protective paper. The means of this invention is used to automatically assemble such a cartridge by inserting the rolled film and spool in the cartridge bottom and by thereafter applying cartridge cover and sealing the two together.

The assembly of such a film cartridge requires a series of precise operations or steps of the type which now are often performed manually by a relatively large group of operators who roll and insert the film in the cartridges with the aid of a series of separate mechanisms to assist them.

The object of the present invention is to provide an apparatus for reducing substantially the number of operators required in the assembly and to perform the entire film rolling, loading, and spooling operations in a continuous process where the cartridge tops and bottoms and spools of film and paper are loaded into the apparatus and where a completely assembled and sealed cartridge is delivered from the system.

While certain suggestions and approaches have been made to provide such automatic apparatus, these have proven unacceptable or adaptable only in an extremely expensive and extremely high volume application which is not suitable for use in many cartridge loading operations where both the investment in machines and the total output do not lend themselves to presently known manual operations or to high volume and intricate automated systems. The present apparatus provides for a relatively high volume output with a machine of limited and practical size suitable for installation in a conventional film processing department or in place of a manual cartridge loading lineup.

Accordingly, an object of the present invention is to provide an improved apparatus for assembling film cartridges.

Another object of the present invention is to provide automatic cartridge loading apparatus of minimum size and convenient form suitable for use in cartridge loading operations of medium volume.

Another object of the present invention is to provide an automatic cartridge loading system of improved reliability requiring a minimum of supervision.

Another object of the present invention is to provide an apparatus for loading a cartridge with light sensitive film where a substantial portion of the automatic operation is performed in daylight.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic view illustrating the process of the invention;

FIG. 2 is a diagrammatic illustration of the cartridge notching and labeling operation;

FIG. 3 is a diagrammatic illustration of the film spooling and insertion operation;

FIG. 4 is an exploded perspective view of a film cartridge showing the top and bottom portions of the cartridge together with the rolled film and the spool;

FIG. 5 is a perspective view of the assembled film cartridge;

FIG. 6 is a front elevational view of the spool attached to the paper and film strips in an unwound condition;

FIG. 7 is a diagrammatic view illustrating the paper perforating means;

FIG. 8 is a top plan view of a section of the preferred paper strip;

FIG. 9 is a diagrammatic view of the film perforating and flashing means;

FIG. 10 is a top plan view of a portion of the film strip showing the perforations and indicating the pre-exposed or flashed lines and numbers;

FIG. 11 is a diagrammatic illustration of the steps in the cartridge notching and labeling process;

FIG. 12 is a diagrammatic perspective illustration showing the steps in the paper and film strip scroll forming operation; and FIG. 13 is a top plan view partially cut away illustrating a preferred embodiment of the conveyor and light trap portion for passing pre-assembled cartridges from a lighted to a darkened processing area for the final assembly.

The method and apparatus of the present invention will first be described generally with particular reference to the diagrammatic FIGS. 1–3 and also FIGS. 4–6 which illustrate a typical film cartridge such as is assembled and sealed by the apparatus and process of this invention.

FIG. 5 shows a cartridge 1 as assembled by the process of the invention ready for use in a camera. This cartridge 1 is furnished in the form illustrated so that it is merely necessary to drop it into the camera and to subsequently expose successive areas of the photographic film by advancing the spool 2. To provide the cartridge in this finished form it is necessary to assemble the several elements best illustrated in FIG. 4. The cartridge is seen to include a hollow casing having a top 3 and bottom 4 and a film exposing aperture 5 and spaced cylindrical spool or roll retaining cavities 6 and 7. In order to protect the film and to provide an index of the successive film frames, a paper strip 8 including the frame numbers 9 is attached to the outer surface of the film 10 as shown in FIG. 6 with the various frame numbers positioned to be exposed through the cartridge top aperture 11.

The cartridge case tops 3 and bottoms 4 are manufactured by conventional plastic molding machinery and are supplied to the assembly point together with the pre-formed plastic spool 2. Rolls of paper printed with the frame numbers and with a control indicator are also supplied at the assembly point in large rolls which are perforated by machinery in the present invention and assembled in the finished cartridge as will be further described below. The film strips 10 suitably sensitized are also provided at the assembly apparatus in rolls where they are perforated and where the frame numbers and frame borders are flashed on the film by the apparatus of the invention as will also be further described below.

FIG. 1 illustrates diagrammatically the several steps referred to above. A labeling and notching machine 14 may be set up in a regular daylight or artificially lighted area for an initial assembly step in which the cartridge tops 3 and bottoms 4 are fitted together temporarily after a film spool 2 has been positioned in one end. Exposure controlling notches 15 are preferably formed during this operation in the plastic cartridge. One notch 15, for example, is positioned in accordance with the film speed of the particular film being loaded so that it cooperates with an appropriate lever in the camera to automatically control the camera exposure while another notch 15 is positioned to set the camera speed for the type of film being used. In addition, a label 16 is applied to the temporarily assembled cartridge indicating the film type and speed and additional information necessary for use in the cartridge.

A final assembly operation is coordinated with the above described labeling and notching operation to complete the loading of the cartridges 1 and to seal them to complete the finished cartridge 1.

Rolls of paper and film for the final assembly are perforated and flashed with the above described perforations and outlines and frame numbers on a film perforator 16 and a paper perforator 17. These rolls of paper and film are fed to or loaded onto the final cartridge assembly machine 18 which preferably is operated in a darkened area to permit free and open handling of the light sensitive film strips during the assembly. As will be more fully described below, this cartridge assembly machine 18 forms short strips of film 10 and protective paper 8 into rolls and then attaches one end of the rolled film and paper to the plastic spool 2 and seals this assembly inside the cartridge 1.

Cartridge notching and labeling operation

It has been found that the final assembly operation by the cartridge assembly apparatus 18 is facilitated where the cartridges 1 are fed to the machine 18 with spools 2 in place and the cartridge tops 3 and bottoms 4 assembled but not sealed together and with the labeling and exposure control notching steps completed.

This pre-assembly is preferably performed in a step-by-step process as, for example, using a rotating turret having a series of operating stations. FIG. 2 illustrates this operation diagrammatically and FIG. 11 illustrates the steps schematically. The cartridge bottoms 4 are first loaded to the turret support at station A and are subsequently carried by the turret to station B where a notcher 20 cuts notches 15 (FIG. 4) in predetermined locations on the cartridge bottoms. Thereafter the cartridge bottoms 4 are carried to the spool feeding station C where a spool 2 is fed to each cartridge bottom 4. Thereafter the cartridge bottom 4 containing the spool 2 is moved to station D where a plunger 21 detects the absence of a spool 2. The cartridge bottom is now presented at a cartridge closing station E where the cartridge top 3 is temporarily applied to the cartridge bottom 4 permitting the label 16 to be thereafter applied to the temporarily closed cartridge 1 at labeling station G after a check at station F by a sensing plunger 22 to check for the presence of the tops 3. The preliminary cartridge assembly with the temporarily closed cartridge 1 including a spool 2 is now transferred at station I to a suitable conveyor for movement to the final cartridge assembly apparatus 18.

Conveyor light trap

FIG. 13 illustrates a preferred embodiment of the cartridge transfer means and light trap 25 for passing the preliminary assembled cartridges 1 from the labeling and notching machine 14 to the cartridge assembly machine 18. FIG. 13 is a top plan view showing cartridges 1 arriving on a conveyor 26 and thereafter passing over a stationary plate 27 to the periphery of a rotating transfer wheel 28. The cartridges 1 pass from the transfer wheel 28 along a pair of guide bars 29 to the outer edge of a second transfer wheel 30 moving in a slot in the partition 31 which moves the cartridges 1 across a second stationary plate 32 to a second conveyor 33 positioned on the opposite side of a wall 34 or other partition which is part of the dark room 35. The transfer wheel 28 has a raised center portion 36 including ring-like felt seal 37 engaging the light trap top wall 38 to insure a light-tight structure. A similar soft sealing ring is preferably used between the bottom of wheel 28 and the bottom wall 39 of the light trap. It is seen that the above arrangement not only provides for a continuous transfer of the pre-assembled cartridges but it also provides for a light trap as the circuitous generally S-shaped path followed by the cartridges in passing from one wheel to the other effectively prevents the passage of light from the inlet of the first conveyor 26 to the outlet provided within the dark room 35 for the second conveyor 33. In order to assure this result both wheels are enclosed in a light-proof chamber including the top 38 and bottom 39 and solid connecting side walls.

A smooth flow of cartridges through the light trap 25 is obtained by rotating the wheels 28 and 30 at about the same speed and by having the wheel rims move at about the speed of the conveyors 26 and 33. The wheels are conveniently driven by a common drive and coupled together by a shaft or chain. The conveyors 26 and 33 may also be conveniently coupled to the same drive system by shaft couplings or chains.

Perforation of the paper and film rolls

In the preferred method of assembly, the final cartridge assembly and sealing operation uses relatively large spools of film and paper from which short lengths are cut and then rolled to form the final cartridge scrolls or spools. To facilitate this operation, a preliminary step is performed to prepare both the paper and the film rolls.

The paper strip or web is provided on rolls with the frame numbers printed on the paper roll and with printed control flags spaced at a pre-determined position with respect to the frame numbers. FIG. 7 illustrates diagrammatically a perforating step wherein perforations 40 are provided on the paper strips 8 to cooperate with the sprocket holes 41 formed on the film 10 to control the film advancing operation in the camera. In the preferred method of punching the perforations 40 on the paper, the paper is continuously advanced from a supply spool 42 and taken up on a continuously turning spool 49 including a slip drive. The paper 8 is intermittently moved through the punch 45 by a drive roller 47. Slack control rollers 44 and 48 accommodate for the intermittent web movement at the punch 45. The punches are operated by a photocell 46 activated by the above described flag or index mark 12' so that the paper 8 is punched during its dwell period during the intermittent paper advancing operation.

The film 10 is similarly supplied in large rolls 50 in a sensitized condition and the perforating and flashing operation is performed on this film in a dark room to prepare it for the final assembly operation. The film 10 is similarly continually supplied from roll 50 by a drive roller 51 towards a punch 53 and a cam operated intermittent drive wheel 54 periodically advances the film 10 into the punch 53 where the film 10 is punched during the dwell periods under the control of a suitable cam or other punch control device. The film 10 passes over several flashing or exposure rollers including rollers 56, 57, and 58 to form longitudinal lines 61 cross lines 62 and frame numbers 63 by exposing the sensitized film to a light source through suitable screens or apertures. A continuously operating roll 60 with a slip clutch drive receives the perforated and flashed film. Slack control rollers 52 and 55 compensate for the intermittent advance of the film 10 at the punch 53.

It will be seen that a novel means have been provided for an automatic assembly or loading of film cartridges. The means described are of particular value for assembling film cartridges of the type used on still camera work where a number of individual exposures are made on a strip of film contained in a closed cartridge. The method and means are particularly useful in replacing cartridge assembly processes previously utilizing a relatively large number of manual operators. The system is adaptable not only for a high output but also for intermediate cartridge production programs not now economically performed by considerably more intricate, expensive, and larger systems as used for extremely high volume cartridge production. The new means therefore provides an almost totally automatic cartridge system useful in a wide range of cartridge loading operations from relatively low volume operations to higher volume operations and provides equipment obtainable at a moderate cost and equipment easily installed in situations now using manual assembly lineups.

In addition the means is simple and reliable and capable of continuous operation with a minimum of supervision and is so arranged so as to facilitate whatever adjustments are necessary by placing the various operating units and by combining the novel steps to facilitate ready observation and easy access to the elements as utilized in the preferred embodiment.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. Means for automatically assembling and loading a hollow film cartridge having separate top and bottom portions and including a spool and a scroll of interwound sensitized film and protective paper comprising the combination of means for inserting the spool in one of the cartridge portions, means for closing the cartridge by applying the other cartridge portion, means for moving the cartridge into an unlighted area, means for cutting and rolling pre-determined lengths of film and paper webs to form a scroll including means for leaving an extending unwound end portion, means for attaching the end of the film to the end of the paper, means for opening the previously closed cartridge and for inserting the wound scroll into one cartridge portion with the unwound end portion extending from the open cartridge, means for thereafter attaching the spool to the unwound end portion, and means for thereafter closing the cartridge by attaching the cartridge top and bottom portions together.

2. The assembling means as claimed in claim 1 in which said cartridge moving means comprises an enclosure having a cartridge inlet and a cartridge outlet and a cartridge conveyor means for moving cartridges therebetween along an indirect path for preventing the passage of light between said inlet and said outlet.

3. The assembling means as claimed in claim 1 in which said cartridge moving means comprises a light trap including a cartridge inlet and a cartridge outlet connected by a moving conveyor having a path with reversed curvature.

4. Means for continuously passing articles from one side to the other of a light impervious wall comprising the combination of an aperture in the wall, a pair of rotatably mounted generally horizontally positioned wheels, said wheels having edge portions positioned adjacent one another, guide means at said adjacent edges positioned for directing articles from one wheel to the other, means to rotate said wheels in opposite directions whereby articles are moved to said guide means by one wheel and away from said guide means by the other wheel, a light proof enclosure in said wall aperture surrounding said wheels, an entrance in said enclosure adjacent an edge of said one wheel and remote from said guide means for the passage of articles to the periphery of said one wheel, and an exit opening in said enclosure adjacent the edge of said other wheel at a position remote from said guide and said entrance whereby articles passing between said entrance and said exit pass along an indirect path on said wheels.

5. The means as claimed in claim 4 which further comprises yieldable sealing members positioned between the top and bottom of said one wheel and the adjacent walls of the enclosure.

6. The means as claimed in claim 4 which further comprises a light blocking partition positioned opposite said entrance and extending from a side of the enclosure in line with said entrance to sand guide to block the passage of light from said entrance toward said exit.

7. Means for continuously passing film cartridges through a wall aperture from a lighted assembly zone to a darkened zone for being loaded with light sensitive film comprising the combination of a hollow enclosure with spaced cartridge passages, a movably mounted cartridge conveyor means having an indirect path between said passages whereby cartridges are moved between said passage without the passage of light into said darkened zone.

8. The means as claimed in claim 7 in which said cartridge conveyor comprises a pair of wheels with adjacent edges, and drive means for rotating the wheels in appropriate directions.

References Cited

UNITED STATES PATENTS

| | | | |
|---|---|---|---|
| D. 195,746 | 7/1963 | Nerwin | D61—1 |
| 3,138,081 | 6/1964 | Nerwin | 95—31 |
| 3,226,816 | 1/1966 | Wilson et al. | 29—200 |
| 3,325,889 | 6/1967 | Meli et al. | 29—200 |

THOMAS H. EAGER, *Primary Examiner.*